United States Patent [19]

Richardson

[11] Patent Number: 4,474,165

[45] Date of Patent: Oct. 2, 1984

[54] COOKING OVEN

[76] Inventor: Robert T. Richardson, 4141 Woodlawn Dr. #40, Nashville, Tenn. 37205

[21] Appl. No.: 426,896

[22] Filed: Sep. 29, 1982

[51] Int. Cl.³ .............................................. F24C 15/08
[52] U.S. Cl. ...................... 126/8; 126/1 R; 126/1 D; 126/19 R; 126/273 R; 126/337 R; 126/290; 99/467; 432/194; 432/249
[58] Field of Search .............. 126/1 R, 1 B, 1 C, 1 D, 126/1 E, 8, 19 R, 273 R, 332–337, 148, 289, 290; 432/120, 194, 249; 99/352, 467

[56] References Cited

U.S. PATENT DOCUMENTS

| 34,540 | 2/1862 | Wassenich | 126/29 X |
|---|---|---|---|
| 125,439 | 4/1872 | Chatain | 126/9 R |
| 259,896 | 6/1882 | Miller | 126/9 R |
| 434,023 | 8/1890 | Middleby | 126/19 |
| 828,330 | 8/1906 | Mooney | 126/148 |
| 1,019,897 | 3/1912 | Howell | |
| 2,350,948 | 6/1944 | Walker | 126/8 |
| 3,098,428 | 7/1963 | Maxwell | 126/8 |
| 3,756,140 | 9/1973 | Kolivas | 126/8 |
| 4,095,586 | 6/1978 | Selva | 126/8 X |
| 4,108,138 | 8/1978 | Petin et al. | 126/19 R |

FOREIGN PATENT DOCUMENTS 406550  12/1943  Italy .................................. 126/9 R Primary Examiner—Samuel Scott
Assistant Examiner—Margaret A. Focarino
Attorney, Agent, or Firm—Lee C. Robinson, Jr.

[57] ABSTRACT

An improved cooking oven having two flat surfaces covered by an enclosure. One of the flat surfaces serves as a base on which the enclosure rests and on which both fuel to be burned and food to be cooked are placed. The second of the flat surfaces, which is substantially parallel to and positioned above the flat surface that acts as the base, serves as a baffle to control the flow of combustion products from the burning fuel through the enclosure and as an additional cooking surface. Three openings in the wall of the enclosure are provided; two of which are used for passage of food and fuel therethrough. The third opening serves as a flue and provides a path through which combustion products from the burning fuel escape from the oven.

10 Claims, 4 Drawing Figures

COOKING OVEN

BACKGROUND OF THE INVENTION

1. Field of the Invention.

The invention relates to an oven that has a dome covering two flat surfaces arranged one above another, wherein food is cooked on both surfaces and fuel is burned on the lower of the two surfaces. The invention also relates to a method of manufacturing such an oven.

2. The Prior Art.

Typically ovens are heated from the outside of the cooking area in order to heat the air and cook the food. Additionally, in structures such as stoves, fireplaces, and other devices that have a partially enclosed space within which solid fuel is burned, the surface on which the fuel rests is not the surface on which the food is placed to be cooked. Prior art cooking structures of this type have been unable to take advantage of the fuel efficiency derived from heating a cooking surface by burning fuel thereon and then placing food to be cooked on the heated surface.

Furthermore, in many cases the shape of the cooking structures utilized heretofore exhibited deficiencies in the reflection of heat radiated by the burning fuel back onto the cooking surface.

U.S. Pat. No. 4,108,138 to Petin and Richardson avoids such drawbacks by providing an oven which includes a dome of refractory material supported by a substantially flat, smooth refractory base on which both food is cooked and solid fuel is burned. The oven has a single opening in the dome wall connected to a passageway through which food and fuel are placed into and removed from the oven, and which also provides access to a flue located just outside the single opening and adjacent to the passageway. Such ovens have not been entirely satisfactory, however, particularly with respect to the restricted flow of air through the dome resulting in a less than optimum combustion of the solid fuel and inefficient cooking of the food. Additionally, the ovens provided an undesirably limited amount of cooking surface inasmuch as the cooking surface necessarily was shared with the solid fuel.

SUMMARY OF THE INVENTION

Accordingly it is an object of the present invention to provide a new and improved oven which avoids the drawbacks of the prior art.

More specifically, it is an object of the present invention to provide a cooking oven in which the flow of hated air within the cooking area of the oven is substantially improved.

It is another object of the present invention to provide an oven which has substantially more cooking surface than the dome-shaped ovens employed heretofore.

Still another object of the invention is to provide an oven which exhibits improved efficiency in the burning of solid fuel and the cooking of food.

In an illustrative embodiment of the invention, the oven includes a base of refractory material which is substantially flat, a portion of which serves as a first cooking surface for cooking food and burning fuel on different areas thereof. A dome made of a plurality of sectors of refractory rests on the base and encloses the first cooking surface as well as a shelf of refractory material positioned parallel to and above the base. Additionally, the dome has three openings, two of which are respectively used for the passage of food and fuel therethrough and a third of which communicates with a flue to draw combustion products away from the burning fuel and food and out of the dome.

In accordance with a feature of several advantageous embodiments of the invention, the shelf is positioned to serve both as an additional cooking surface and as a baffle to control and direct the flow of air through the dome and thereby improve combusiton of the fuel. Movable closures, such as sliding doors, are attached to the two openings associated with passage of fuel and food to further control the flow of air through the dome and thereby sustantially improve the overall efficiency of the oven.

The present invention, as well as further objects and features thereof, will become more fully apparent from the following description of certain preferred embodiments, when read with reference to the accompanying drawings.

DETAILED DESCRIPTION OF CERTAIN PREFERRED EMBODIMENTS

Figure 1:
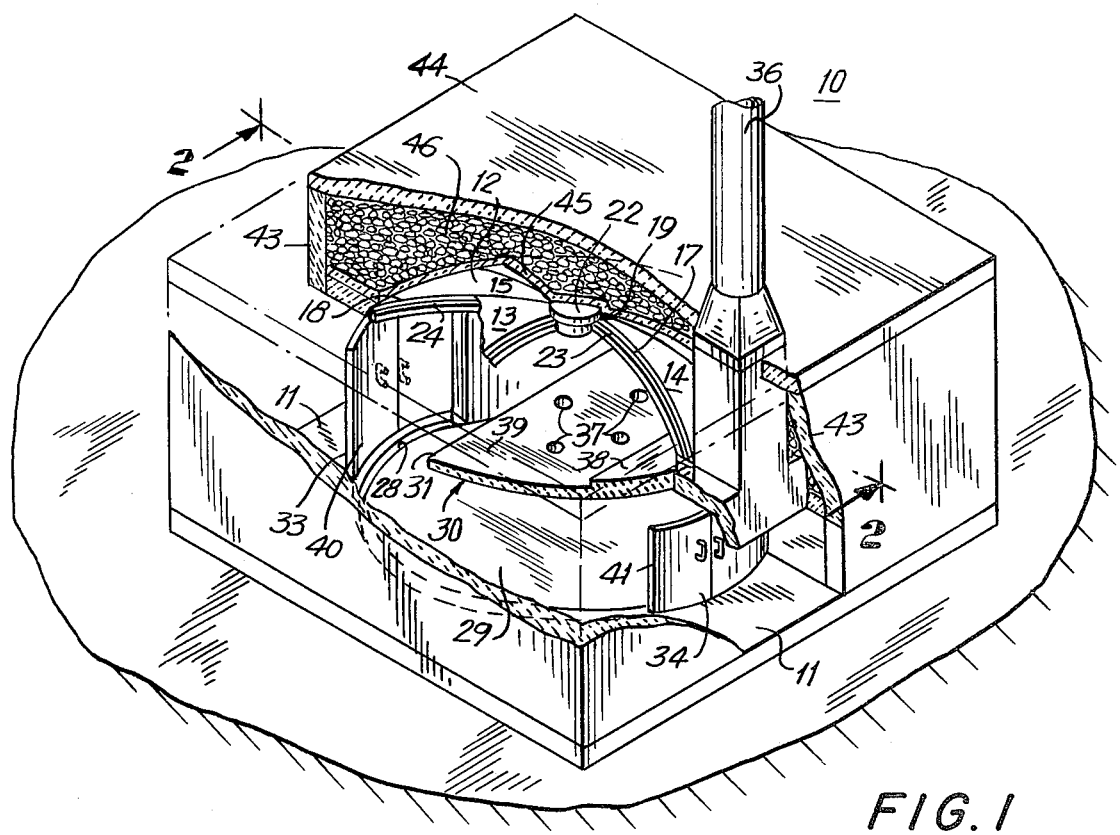
FIG. 1 is a perspective view of an oven and enclosure in accordance with an illustrative embodiment of the present invention with portions thereof cut away.

FIG. 1 illustrates an oven 10 with portions thereof removed to facilitate description of parts therein. The oven 10 is built on a base or hearth 11 of suitable material having refractory qualities, such as a five inch layer of Moldit D embedded with metal fibers. The base 11 is normally formed, or poured, at the site of the oven and typically has, although is not restricted to, a dimension of approximately eight feet square.

The oven 10 includes a dome 12 of a generally hemispherical shape which desirably has its highest part not too far above the base 11 so as to form substantially a half oblate spheroid. The dome 12, which is made of a refractory, fire-resistant material such as firebrick, typically is about six feet in diameter and is quite heavy.

The dome 12 is assembled by placing a plurality of precast sectors such as sectors 13, 14, and 15 together. The sectors are characterized by arcuate longitudinal edges such as edge 17 of sector 14 and edge 18 of sector 15. Each edge extends from a narrow end, such as narrow end 19 of sector 14, to a larger sector end such as larger end 21 of sector 15. The larger ends thereby form the equivalent of an equator of the dome 12. The narrow ends of all of the dome sectors can be brought together at a point and sealed thereat by fire-resistant mortar, or as shown in FIG. 1 they may be truncated with their upper ends in contact with a plug 22 at the top of the dome 12. All of the joints between the narrow ends of the sectors and the plug 22 are sealed together by fire-resistant mortar. Additionally, all joints between abutting sectors are sealed together with fire-resistant mortar. The thickness of the sectors of the dome, typically, is about four and a half inches. Longitudinal edges 17 and 18 have portions in the form of a tongue 23 and a groove 24, respectively, to provide interlocking between sectors. Other interlocking configurations, such as convoluted configurations, can also be used to aid in holding each sector in place and sealing the joints between adjacent sectors. In all such configurations, the interconnections between the sectors form airtight seals.

Figure 2:
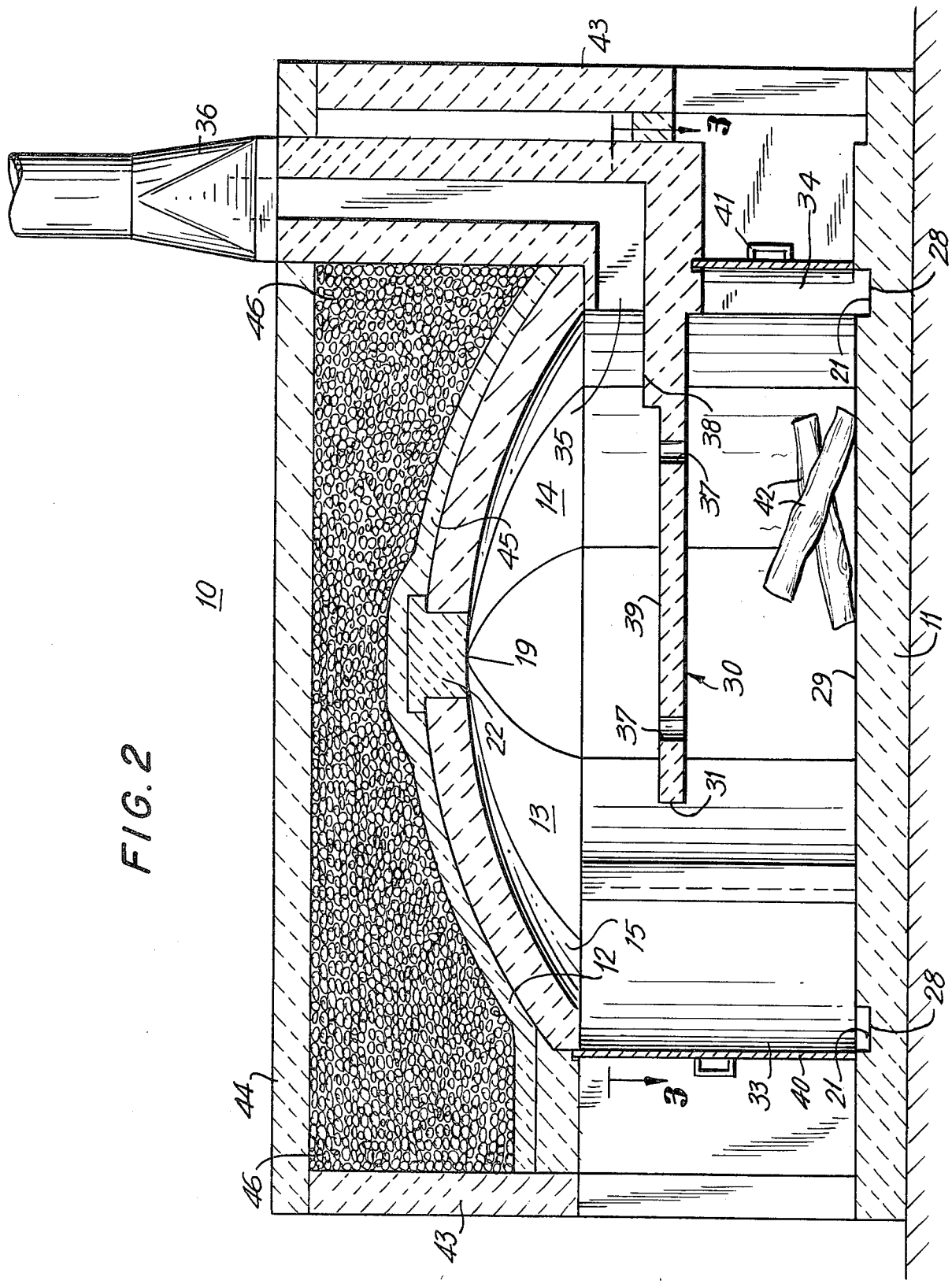
FIG. 2 is a sectional view of the oven taken along line 2—2 of FIG. 1.

As shown in FIG. 2, a groove 28 in base 11 is used to seat the large end of some or all of the dome sectors into the base and thereby further aid in holding the sectors in place. In the illustrated embodiment the circumferential length of the groove 28 is larger than that of the large ends of the sectors so that the sectors can slide circumferentially in the groove and thereby move the hemispherically longitudinal edges into abutment with each other.

An area 29 of the base 11 under the dome 12 serves as both a cooking surface and a surface on which fuel, such as logs, can be burned to produce the required heat for cooking. Alternate sources of fuel which also can be used inlcude, but are not limited to, gas, oil, or electricity. The temperature within the dome can be as high as about 900° F.

Figure 3:
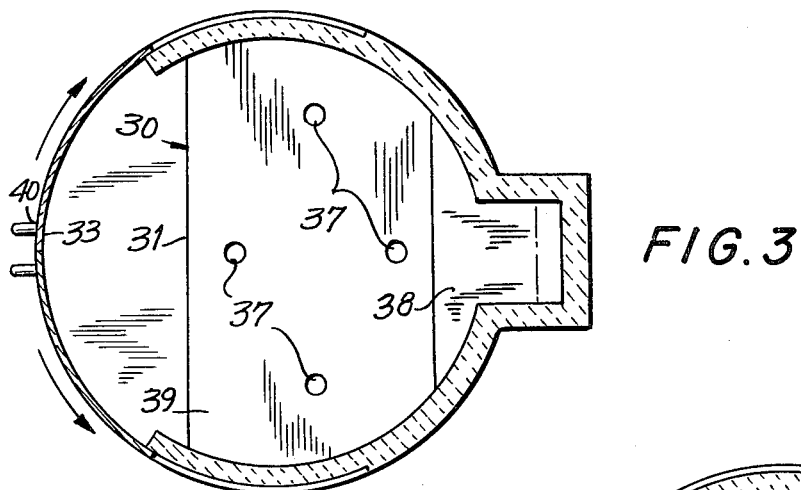
FIG. 3 is a sectional view of the oven taken along line 3—3 of FIG. 2.

A shelf 30 of a refractory material, such as firebrick, serves as an additional cooking surface and/or as a surface on which to keep food warm after it has been cooked. The shelf 30 in one embodiment and as illustrated in FIGS. 1 and 3 is in the shape of a round, substantially flat plate, such as a disc, with one edge cut off forming a substantially straight front edge 31, and with the remaining peripheral edge of the shelf substantially conforming to the circular, interior contour of the dome 12. As shown in FIG. 2, the shelf is connected to the interior portions of the dome and is substantially parallel to and above base 11.

In order to place the fuel and food to be cooked in the oven 10, two openings 33 and 34 are formed in the wall of the dome 12. Opening 33, generally through which food is placed into and removed from the oven, has its lower edge at or near base 11 and its upper edge below the top of the dome 12, but above the level of the shelf 30. Opening 34, generally through which fuel is placed into and removed from the dome 12, typically is located diametrically opposite opening 33, and has its lower edge at or near base 11 and its upper edge at or below shelf 30.

A third opening 35, formed in the wall of the dome 12, communicates with a flue 36 to allow combustion products produced by the burning fuel on the cooking surface 29 to be drawn out of the dome 12. More particulary, the third opening 35 is located above shelf 30 and below the top of the dome and preferably substantially directly above the second opening 34. Flue 36, which extends upwardly from the adjacent to the top of the dome 12, is defined by a chimney which preferably is integral with the dome 12 and is made from a metal or metal alloy or other suitable material.

The combustion products from the burning fuel, located on cooking surface 29, travel substantially horizontally along the cooking surface 29, beneath the shelf 30, then around the shelf front edge 31, the substantially horizontally along the top of the shelf and then through the third opening 35 and the flue 36. The shelf 30 serves as a baffle to control the flow of air through the dome and thereby regulates the flow of combustion products through the dome. Furthermore, holes 37 in the shelf are provided to improve the draft through the dome. These holes are located above the burning fuel on the surface 29 and at other random positions to provide a controlled disturbance of the laminar flow of combustion products above and below the shelf and thereby facilitate the retention of heat within the dome.

Figure 4:
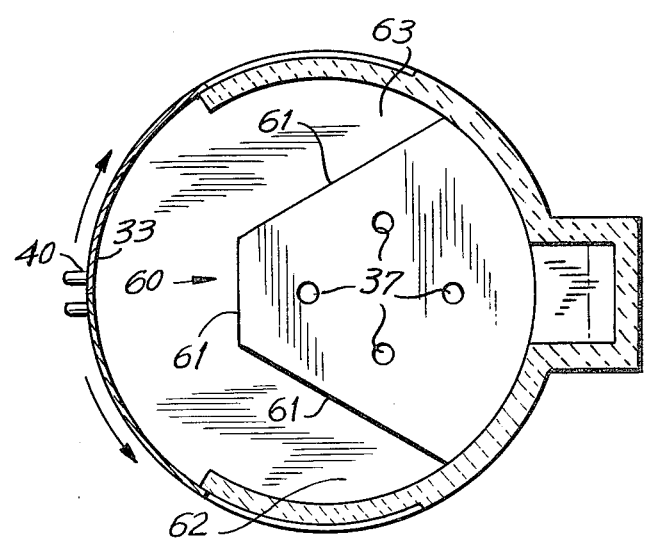
FIG. 4 is a sectional view similar to FIG. 3 of an alternate embodiment of the invention.

In the embodiment illustrated in FIG. 3, the front edge 31 of the shelf 30 extends along a straight line from one portion of the inner periphery of the dome 12 to the other in a direction parallel to the dome's diameter. In other advantageous arrangements the front edge of the shelf is foreshortened such that the shelf is of generally trapezoidal configuration. Referring to FIG. 4, for example, there is shown a shelf 60 having an angular front edge 61 to provide side openings 62 and 63 between the shelf and the adjacent interior wall of the dome. One advantage of this construction is that some of the heat generated from the burning fuel rises upwardly along the side portions of the front edge of the shelf and is reflected back onto the cooking surfaces by the dome's hemispherical contour. With this arrangement there is a more uniform heat distribution within the dome.

The shelf 30 is stepped to provide top and bottom levels 38 and 39, respectively. Top level 38 is located nearer to the top of the dome than bottom level 39 and is located adjacent the third opening 35.

Movable closures, such as pairs of sliding doors 40 and 41, are attached to respective openings 33 and 34. Each pair of sliding doors substantially seals or opens its corresponding opening to prevent or permit food and fuel to pass therethrough, respectively. In a preferred embodiment, while food is being cooked in the oven, sliding doors 40 are kept closed and sliding doors 41 are kept partially open to serve as a further means for controlling the flow of air through the dome. Additional means of controlling the flow of air through the dome can be provided by placing a baffle or damper (not shown) in flue 36.

Food and fuel are disposed on cooking surface 29 such that neither the food nor the fuel comes into contact with each other. For example, the fuel can be banked against the interior surface of the dome wall to leave a clear area in the center of the cooking surface 29 and near opening 33 for food to be placed. Alternatively, as shown in FIG. 2, the solid fuel such as logs 42 can be disposed near the opening 34 leaving the remaining cooking surface 29 for food to be cooked. As noted previously, by burning the fuel on the same surface as that used to cook the food, maximum use is made of the available heat. Additionally, by using the walls and top of the dome to reflect heat radiated by the burning fuel back onto cooking surface 29 and shelf 30, additional fuel efficiencies are obtained.

Surrounding the dome 12 is an outer wall 43 of brick or other suitable structural material. The wall 43 extends alongside the dome 12. The height of the wall 43 is greater than the exterior height of the dome 12, and a cover 44, which preferably includes a number of relatively narrow slats, which are removable if necessary, rests on the edges of the wall 43 to enclose the dome 12. As disclosed previously, the dome 12 can be made of firebrick instead of pre-cast refractory material although the latter greatly simplifies construction.

Insulating material is placed in the space between the outer surface of the dome 12 and the inner surfaces of the wall 43 and the cover 44. The insulating material includes a ceramic fiber blanket 45 directly over the dome 12. Further insulating material is provided in the form of Vermiculite 46, for example, to fill the space between the blanket 45 and the wall 43 and beneath the cover 44.

The cross sectional view of the oven in FIG. 2 shows the flattened hemispherical shape of the dome 12. Inasmuch as the dome need not be a perfect hemisphere of an oblate spheroid, the walls of the dome 12 can extend straight up before beginning to curve inwardly to form the upper part of the dome. Typically, the height of the straight portion of the walls is approximately thirty one inches from the lower edge 21 which includes approximately two inches seated in the groove 28 of base 11.

Additional typical dimensions for the dome 12 include a maximum internal diameter of six feet, a dome wall thickness of four and a half inches, and a maximum internal height of forty and a half inches extending from cooking surface 29 to the bottom of the plug 22. The shelf 30 typically has a thickness of approximately two and a half inches, is approximately eighteen inches from cooking surface 29 in a perpendicular direction therefrom, and extends approximately fifty one inches from third opening 35 to front edge 31 of the shelf. A suitable thickness of the ceramic fiber blanket 45 is approximately two inches. A suitable thickness of the base 11 is approximately five inches. The wall 43 is approximately sixty three inches high and cover slabs 44 are approximately four and a half inces thick. Additionally, the flue 36 has a diameter of aproximately eight inches. It should be noted, however, that the above dimensions are not to be viewed as limitations on the scope of the present invention, but rather as one particularly advantageous embodiment thereof.

As indicated previously, in the illustrated embodiments the base 11 is formed at the site of the oven and is made from a refractory known as Moldit "D" with metal fibers dispersed therein. The sectors making up the dome 12 are formed of the same material as the base 11. The sectors are first molded separately and then brought in finished form to the oven construction site to be assembled. Thus the more difficult task of molding the dome 12 in one piece and then transporting it to the oven site without cracking it is avoided. In other embodiments, however, the dome may be cast in a single piece either at the site or at a remote location.

The oven of FIGS. 1 to 4 allows for cooking directly on the same surface as that on which the burning fuel is placed. The oven reflects heat radiated by the burning fuel back onto the cooking surfaces while providing a substantial flow of air through the oven to improve the combustion of the fuel. Such improved fuel combustion results in increased fuel efficiencies. More particularly, control of the air flow within the dome is provided by a shelf which is positioned to serve as a baffle while also serving as an additional cooking surface. Further control of the air flow is obtained by connecting movable closures to two of the three openings in the dome wall. The two openings provide easy access to the cooking surfaces facilitating passage of fuel and food into and out of the oven.

Having described specific embodiments of the invention with reference to the accompanying drawings, it is to be understood that the invention is not limited to those precise embodiments, and that other embodiments and modifications thereof will become apparent to those skilled in the art and will fall within the spirit and scope of the invention as defined in the following claims.

What is claimed is:
1. An oven comprising:
   a base of refractory material which is substantially flat and serves as a first cooking surface for cooking food and burning fuel on different areas of said base;
   a dome of refractory material which rests on and encloses said first cooking surface;
   a shelf of refractory material which is substantially flat, said shelf being stepped to define upper and lower surfaces substantially parallel to said base, the shelf having a front edge, said shelf being disposed within and connected to an interior surface of said dome, the shelf serving as a second cooking surface for cooking food;
   means forming a first opening in said dome which is defined by a lower edge near said base and an upper edge below a top portion of said dome, said means forming the first opening facilitating access to the first and second cooking surfaces;
   means forming a second opening in said dome which is defined by a lower edge near said base and an upper edge below said shelf, said means forming the second opening facilitating access to the first cooking surface for the placement of fuel thereon;
   means forming a third opening which is defined by a lower edge above said shelf and an upper edge below said top portion of said dome, said means forming the third opening being situated substantially directly above said means forming the second opening;
   a flue defining means extending upwardly from and adjacent to said top portion of said dome and which communicates with said third opening;
   said shelf serving as a baffle in controlling the flow of combustion products from said burning fuel through said dome such that said combustion products escape from said oven by traveling substantially horizontally along said first cooking surface, around said front edge of said shelf, substantially horizontally along said upper surface of said shelf, and through said third opening and said flue, the upper surface of the shelf being located nearer to said top portion of said dome than said lower surface of the shelf and between said means forming said third opening and said lower surface.

2. An oven as in claim 1; wherein said dome comprises a plurality of separate fire-resistant sectors each defined by edges extending outwardly and curved downwardly from a narrow end to a large end, said edges comprising convolutions that interfit with abutting edges of adjacent sectors, fire-resistant mortar joining said abutting edges together to form a substantially air-tight seam between them, and a central plug at the top of said dome sealed to said narrow end of each of said sectors by said fire-resistant mortar, said large ends of a plurality of said sectors forming an edge resting on said base.

3. An oven as in claim 1; wherein said means forming said first and second openings are positioned substantially diametrically opposite each other.

4. An oven as in claim 1; wherein said flue defining means is integral with said dome.

5. An oven as in claim 1; wherein said means forming said first and second openings have movable closure means attached thereto such that when cooking food in said oven said means forming said first opening is generally sealed by closure means attached thereto and said means forming said second opening is partially closed by closure means attached thereto to thereby control the flow of air traveling through said dome.

6. An oven as in claim 1; wherein said fuel is wood.

7. An oven as in claim; wherein said shelf has means forming one or more openings therethrough to provide a greater flow of air through said dome and to provide a controlled disturbance of the laminar flow of combusition products above and below said shelf.

8. An oven as in claim 1; wherein said front edge of said shelf is characterized by being substantially straight.

9. An oven as in claim 1; wherein the front edge of said shelf is foreshortened to provide side openings between said shelf and the walls of the dome.

10. An oven comprising:
- a base of refractory material which is substantially flat and serves as a first cooking surface for cooking food and burning solid fuel on different areas of said base;
- a dome having a plurality of separate fire-resistant sectors each defined by edges extending outwardly and curved downwardly from a narrow end to a large end, said edges comprising convolutions that interfit with abutting edges of adjacent sectors, fire-resistant mortar joining said abutting edges together to form a substantially air-tight seam between them, and a central plug at the top of said dome sealed to said narrow end of each of said sectors by said fire-resistant mortar, said large ends of a plurality of said sectors forming an edge resting on said base, said dome enclosing said first cooking surface;
- a shelf of refractory material which is substantially flat, includes upper and lower surfaces substantially parallel to said base, and serves as a second cooking surface for cooking food and keeping food warm, said shelf being disposed within and connected to an interior surface of said dome, and is characterized by a front edge which is substantially straight;
- means forming a first opening in said dome generally through which food is placed into and removed from said oven, defined by a lower edge near said base and an upper edge below said dome top, and which has movable closure means attached thereto;
- means forming a second opening in said dome, generally through which said solid fuel is placed into and removed from said oven, defined by a lower edge near said base and an upper edge below said shelf having movable closure means attached thereto and which is positioned substantially diametrically opposite said first opening;
- means forming a third opening defined by a lower edge above said shelf and an upper edge below said dome top and which is substantially directly above said second opening; and
- a flue defining means extending upwardly from and adjacent to said dome top wherein said flue is integral with said dome and communicates with said third opening;
- said shelf serving as a baffle in controlling the flow of combustion products from said burning solid fuel through said dome such that combustion products escape from said oven by traveling substantially horizontally along said first cooking surface, around said front edge of said shelf, substantially horizontally along said upper surface of said shelf, and through said means forming said third opening and said flue defining means.

* * * * *